(12) United States Patent
Cao (10) Patent No.: US 8,710,611 B2
(45) Date of Patent: Apr. 29, 2014

(54) HIGH SENSITIVITY STRESS SENSOR BASED ON HYBRID MATERIALS

(75) Inventor: Xian-An Cao, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 212 days.

(21) Appl. No.: 13/353,464

(22) Filed: Jan. 19, 2012

(65) Prior Publication Data
US 2012/0187368 A1 Jul. 26, 2012

Related U.S. Application Data (60) Provisional application No. 61/461,702, filed on Jan. 20, 2011.

(51) Int. Cl.
*H01L 21/02* (2006.01)

(52) U.S. Cl.
USPC ............................................. 257/444; 438/22

(58) Field of Classification Search
None
See application file for complete search history.

(56) References Cited

U.S. PATENT DOCUMENTS

| | | | |
|---|---|---|---|
| 7,718,950 B2 | 5/2010 | Saraf | |
| 2008/0061687 A1* | 3/2008 | Cok et al. | 313/506 |
| 2008/0093608 A1 | 4/2008 | Chik et al. | |
| 2009/0238511 A1* | 9/2009 | Quitoriano et al. | 385/2 |
| 2009/0278141 A1* | 11/2009 | Coe-Sullivan et al. | 257/89 |
| 2010/0032552 A1* | 2/2010 | Doshida et al. | 250/225 |

OTHER PUBLICATIONS

V. Maheshwari and R. Saraf, Angew. Chem. Int. Ed. 47 (2008) 7808.
S. A. Mascaro, H. H. Asada, IEEE Trans. Rob. Autom. 17 (2001) 698.
S. P. Lacour, C. Tsay, and S. Wagner, IEEE Electron. Dev. Lett. 25(2004) 792.
D. D. Rossi, F. Carpi, and E. P. Scilingo, Adv. Colloid Interface Sci. 116 (2005) 165.
G. Y. Zhong, Y. Q. Zhang, and X. A. Cao, IEEE Electron. Dev. Lett. 30 (2009) 1137.
J. Engel, J. Chen and C. Liu, J. Micromech. Microeng. 13 (2003) 359.
V. Maheshwari and R. F. Saraf, Science 312 (2006) 1501.
M. Chandrasekhar, S. Guha, and W. Graupner, Adv. Mater. 13 (2001) 613.
H. G. Drickamer, and C. W. Frank, Annu. Rev. Phys. Chem. 23 (1972) 39.

(Continued)

*Primary Examiner* — Julio J Maldonado
*Assistant Examiner* — Sonya D McCall Shepard
(74) *Attorney, Agent, or Firm* — Gary J. Morris (57) ABSTRACT

A sensing device is used to detect the spatial distributions of stresses applied by physical contact with the surface of the sensor or induced by pressure, temperature gradients, and surface absorption. The sensor comprises a hybrid active layer that includes luminophores doped in a polymeric or organic host, altogether embedded in a matrix. Under an electrical bias, the sensor simultaneously converts stresses into electrical and optical signals. Among many applications, the device may be used for tactile sensing and biometric imaging.

27 Claims, 6 Drawing Sheets

Magnified View of Active Layer 40

(56) References Cited

OTHER PUBLICATIONS

G.Y. Zhong, Y. Liu, J. Song, Q. Zhao, Y.S. Li, F.Y. Li, J. Phys. D: Appl. Phys. 41 (2008) 205106.

M. A. Baldo, S. Lamansky, P. E. Burrows, M. E. Thompson, and S. R. Forrest, Appl. Phys. Lett. 75 (1999) 4.

G. Y. Zhong, Y. Q. Zhang, and X. A. Cao, Org. Electron. 11(8) (2010) 1338.

S. Reineke, G. Schwartz, K. Walzer, M. Falke, and K. Leo, Appl. Phys. Lett. 94 (2009) 163305.

Y. Q. Zhang, G. Y. Zhong, and X. A. Cao, J. Appl. Phys. 108 (2010) 083107.

J. X. Cao, X.G. Gong, and R.Q. Wu, Phys. Rev. B75 (2007) 233302.

D. L. Dexter, J. Chem. Phys. 21 (1953) 836.

K. Goushi, R. Kwong, J. J. Brown, H. Sasabel, and C. Adachi, J. Appl. Phys. 95 (2004) 7798.

W. Chang, T. Fang, S. Yeh and Y. Lin, Senors (2009) 1188-1203.

S. Mannsfeld et al, Nature Materials (vol. 9, 2010) 859-864.

* cited by examiner

Top View of the Bottom
Isolated (micro-patterned)
electrode

FIG. 5

Top views of the first and second electrodes which form two sets of parallel micro-contact lines perpendicular to each other.

FIG. 6

HIGH SENSITIVITY STRESS SENSOR BASED ON HYBRID MATERIALS

REFERENCE TO RELATED APPLICATIONS

This application claims the benefit of U.S. Provisional Application Ser. No. 61/461,702 filed on Jan. 20, 2011 entitled "A High Sensitivity Stress Sensor Based on Hybrid Materials" the disclosure of which is hereby incorporated by reference.

STATEMENT OF GOVERNMENT INTEREST

This invention was made partially with U.S. Government support from NASA Agreement No. NNX07AL53A.

BACKGROUND OF THE INVENTION

The invention relates generally to the field of semiconductor sensors. More particularly, the invention relates to a stress sensor based on hybrid materials and methods of making the same.

Tactile sensors have gained renewed interest as the level of sophistication in the applications of humanoid robotics and minimal invasive surgery increases. Most robotic systems incorporate binary touch sensors that can distinguish between touch and no touch. To improve the manipulative capabilities of robotic hands, more sophisticated tactile sensors that can replicate the sensation of touch are needed. That would require the development of a device that can be mounted on a curved surface and sense a distribution of contact stress as low as 10 kPa at a high spatial resolution of about 40 µm over a contact area of ~1 $cm^2$. Many technologies have been explored for tactile sensing, including conducting elastomers, piezoresistive materials, and micro-electro-mechanical systems. However, their use in dexterous hands are hampered due to two limitations: (i) poor spatial resolution lagging by one order of magnitude compared to a human finger; and (ii) strain-induced nonuniform background signals in devices built on large curved surfaces due to the lack of flexibility. Recently, a new tactile sensor consisting of alternating layer of nanoparticles and dielectric materials was demonstrated. The sensor was capable of imaging stress distributions with a high spatial resolution, but its practical use may be limited by the complexity of the device structure and processing.

Organic and polymeric materials are flexible and sensitive to external stresses. Upon compression, their resistivity may change dramatically due to reduced intermolecular distance and increased orbital overlap which lead to higher rates of electron transfer between neighboring molecules. This sensitive piezoresistive response to deformation makes them attractive materials for stress sensing applications. In addition, many organic and polymeric dyes have superior fluorescent or phosphorescent properties, and have been used to develop high-efficiency organic light-emitting diodes (OLEDs). The quantum efficiency of OLEDs is largely dependent upon carrier tunneling and energy transfer processes, whose rates are strong functions of the intermolecular distance. Therefore, organic and polymeric thin films may respond to applied forces with changes in current density as well as luminescent emission. Given these unique behaviors, along with easy fabrication and compatibility with flexible substrates, it is possible to use organic and polymeric thin films to build simple and low-cost tactile sensors which are capable of high-resolution imaging of stress distributions (stress fields).

The present invention employs a hybrid light-emitting diode structure as tactile sensing devices by utilizing their sensitive and repeatable responses to stresses with changes in current density as well as electroluminescent light intensity. These devices find use in many other fields, including biometrics and medial applications.

SUMMARY OF THE INVENTION

In accordance with an embodiment of the invention, a stress sensing device that can work as an electronic or optoelectronic sensor is provided. The sensor includes a supporting substrate. A contact layer is disposed on the substrate as the first electrode. An active layer comprising luminophores doped in a host and embedded in a matrix is disposed on the first electrode. Further, a contact layer is disposed on the active layer as the second electrode.

In accordance with another embodiment of the invention, a stress sensing device that can work as an electronic or optoelectronic sensor is provided. The sensor includes a supporting substrate. A contact layer is disposed on the substrate as the first electrode. An active layer comprising luminophores doped in a host and embedded in a matrix is disposed on the first electrode. Further, a contact layer is disposed on the active layer as the second electrode. The sensor further includes at least one of a hole injection layer that is disposed between the active layer and the first electrode, and an electron injection layer that is disposed between the active layer and the second electrode.

In yet another embodiment of the invention, a stress sensing device that can work as an electronic or optoelectronic sensor is provided. The sensor includes a supporting substrate. A contact layer is disposed on the substrate as the first electrode. An active layer comprising luminophores doped in a host and embedded in a matrix is disposed on the first electrode. Further, a contact layer is disposed on the active layer as the second electrode. At least one of the electrodes is micro-patterned and consists of isolated micro-contacts or a set of parallel micro-contact lines. The sensor further includes at least one of a hole injection layer that is disposed between the active layer and the first electrode, and an electron injection layer that is disposed between the active layer and the second electrode.

These and other advantages and features will be more readily understood from the following detailed description of preferred embodiments of the invention that is provided in connection with the accompanying drawings.

DETAILED DESCRIPTION

Figure 1:
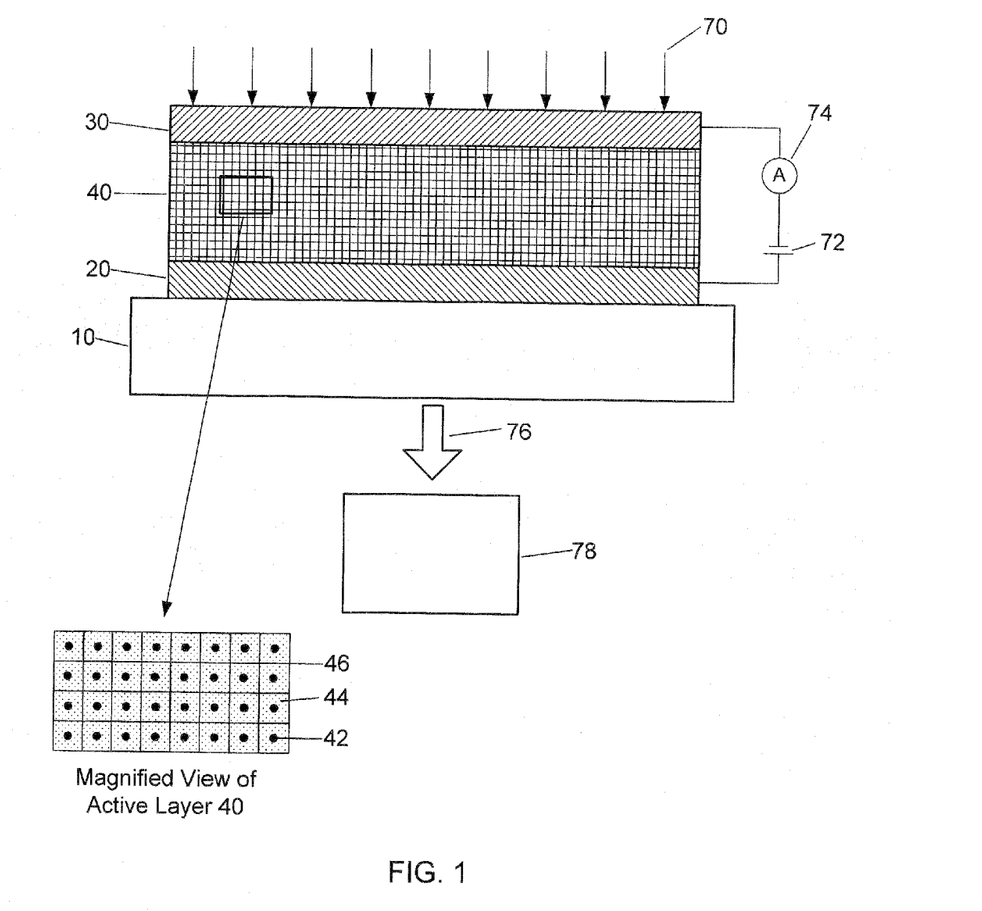
FIG. 1 illustrates the schematic cross section of an optoelectronic (light-emitting) stress sensor and a magnified view of the active layer of the device. The device may also work as an electronic sensor.

This invention is a family of devices which work as optoelectronic or electronic sensors to measure stress distributions over the area of the contact. To facilitate the description, the polarity of the sensors (FIGS. 1, 2, 5 and 6) is arbitrarily chosen as the top surface of the sensors where forces or stress fields are applied through physical contact. The bottom surface of the sensors is the surface of a supporting substrate, through which optical signals are extracted. FIG. 1 shows a typical configuration of the optoelectronic sensors. It comprises a supporting substrate 10, a contact layer disposed on the substrate 10 as the first electrode 20, an active layer 40 disposed on the first electrode 20, and another contact layer disposed on the active layer as the second electrode 30. The sensor is actually a light-emitting diode. To facilitate the description, the first electrode 20 of the device is arbitrarily chosen as the anode, where holes are injected into the active layer, whereas the second electrode 30 is the cathode where electrons are injected and forces are applied. Both the first electrode 20 and second electrode 30 have first and second surfaces. The active layer 40 also has first and second surfaces. The first surface of the first electrode 20 adjoins the substrate 10. The second surface of the first electrode 20 adjoins the first surface of the active layer 40 and the first surface of the second electrode 30 adjoins the second surface of the active layer 40 forming a sandwich configuration with the active layer 40 positioned between the first electrode 20 and the second electrode 30. A variation in the stress field experienced by the second surface of the second electrode 30 results in a variation in sensor output (light intensity or electrical current). The second electrode or the substrate may experience a stress field due to direct contact, pressure, temperature gradient across an element attached to the second electrode, or surface adsorption through an element attached to the second electrode or substrate. Non-limiting examples of elements attached to the second electrode or substrate include bimetallic strips, cantilever membrane, piezoelectric membrane, etc.

Due to the excellent flexibility of the layered structure, the sensor may be built on large curved surfaces of different substrates. The substrate 10 may comprise any rigid or flexible material that is insulating, semiconducting, or conducting. When the sensor works as an optoelectronic sensor and light is extracted from the substrate 10 (FIG. 1), the substrate 10 should comprise a material that is transparent or semi-transparent at the wavelength of interest, including, without limitation, glass, quartz, sapphire, polymers, and wide band gap semiconductors. When the device is used as an electronic sensor, there is no specific requirement for the optical properties of the substrate material.

The first electrode 20 and second electrode 30 are of conducting or semiconducting material. For the optoelectronic sensor, the first electrode 20 is also of transparent or semi-transparent material. Examples of materials for the first electrode 20 include, but not limited to, thin metals like Au, Pt and Ni, and transparent conductive oxides like indium tin oxide (ITO) and zinc tin oxide (ZTO). There is no restriction on the optical properties on the second electrode 30, but a material with high reflectivity at the wavelength of interest is preferred. It is also preferred that the second electrode 30 is relatively thin so it has good flexibility. In some embodiments, the second electrode 30 may not be deposited on the surface of the active layer 40, but attached to another supporting template, through which the sensing forces 70 are applied. During operation, the second electrode 30 is brought in physical contact with the layered structure so that stress is applied to the active layer 40. Examples of the material of the second electrode 30 include, but not limited to, Al, Ca and Ag.

The active layer 40 comprises luminophores 42 doped in a host 44, altogether embedded in a matrix 46. The matrix 46 comprises a material that is more mechanically stable than organic materials and can enhance the robustness of the hybrid sensor structure. Examples of the matrix material include, but not limited to, polymers such as polycarbonate (PC), polyimide, and poly[N,N-bis(4-butylphenyl)-N,N-bis(phenyl)benzidine], as well as amorphous or polycrystalline inorganic materials like ZnO, and $SiO_2$. The host 44 comprises a material that can accept charge injected from the first electrode 20 and the second electrode 30, generate excitons, and efficiently transfer energy to the luminophores 42. In exciton energy transfer processes, the host molecules act as donors whereas the luminophores 42 act as acceptors. Examples of the host material include, but not limited to, organic small molecule materials such as 4,4'-N,N'-dicarbazole-biphenyl (CBP), N,N'-dicarbazolyl-3,5-benzene (mCP), and 4,4',4",-tris(N-carbazolyl)triphenylamine (TCTA), as well as polymers like carbazoles and polyphenylenes. The luminophores 42 are particles which can accept energy from the host molecules and emit light efficiently. Examples of the luminophore material include, but not limited to, phosphorescent organic dyes such as fac-tris(2-phenylpyridinato-N,C2') iridium (III) [$Ir(ppy)_3$] and Bis(1-(phenyl)isoquinolinato-N,$C^2$) iridium acetylacetonate [$Ir(piq)_2(acac)$], fluorescent organic dyes such as tris-(8-hydroxyquinoline) aluminum ($Alq_3$) and 2-methyl-6-(p-dimethylaminostyryl)-4H-pyan (DCM), polymeric dyes like Poly(p-phenylene vinylene) (PPV), nanocrystal quantum dots (QDs) based on direct band gap semiconductors like CdS, CdSe, CdTe, ZnS, ZnSe, GaAs, and InP, as well as combinations thereof.

The first electrode 20 and second electrode 30 can be deposited by physical deposition techniques such as evaporation deposition and sputtering deposition in a vacuum chamber. For those of ordinary skill in the art will appreciate that there are numerous ways to deposit the hybrid active layer 40 on the first electrode 20, including spin-coating, drop casting, and inkjet printing from a solution containing the matrix, host and luminophores. Before deposition, the substrate 10 and first electrode 20 may be carefully cleaned in sequence in solvents and de-ionized water, and treated in $O_2$ plasma or ultraviolet ozone. The matrix, host and luminophore materials can be first dissolved in the same or different nonpolar solvents such as chloroform and hexane to form solutions with a concentration on the order of 10 mg $mL^{-1}$, and then mixed at an appropriate weight ratio, for example, 20:50:30. The weight ratio can be adjusted to achieve the best sensor performance. The thickness of the active layer 40 is in the range of 1-1000 nm, and more preferably in the range of 10-100 nm. Before loading the sample into an evaporator to deposit the second electrode 30, the active layer 40 may be baked at a moderate temperature in the range of 50-200° C., for a time in the range of 10 sec to 30 min, to evaporate the remaining solvents. It is preferred that the process is done in an inert ambient such as a $N_2$-filled glovebox.

To operate this sensor, a voltage (electrical potential) is applied by connecting the positive terminal of a voltage source 72 to the first electrode 20 and the negative terminal to the second electrode 30. The voltage is typically less than 50

V, preferably less than 20 V. The voltage causes a current flow in the device that can be measured by a current meter 74. Electrons and holes are injected into the active layer 40 from the first electrode 20 and second electrode 30, respectively. They will form excitons on the host molecules, which can efficiently transfer the energy to the excitons in the luminophores 42 through a resonant energy transfer process (Förster energy transfer). The radiative decay of the excitons in the luminophores 42 leads to the emission of electroluminescent light 76 that can be extracted from the substrate 10 and measured by a photodetector 78. As an external force (stress field acting over an area) 70, which may be caused by physical contact or induced by pressure, temperature gradients, and surface absorption, is applied to the top or bottom surface of the sensor, it causes compressive strain in the active layer 40, reducing the intermolecular spacing. This leads to increased rates of charge transfer between neighboring molecules through hopping, and thus an increased electrical conductivity of the hybrid film in the direction of the force 70. The force 70 may vary across the top surface of the sensor. In the sensor of the present invention, a small percent of deformation may lead to a significant increase in the current flow under a constant voltage bias. Since Young's moduli of typical matrix and host materials are on the order of GPa, the sensor is capable of converting stresses on the order of kPa into current variations and sensing touch on a par with a human finger, which typically applies a stress on the order of 10-40 kPa to sense texture and shape.

In the meantime, since the rates of energy forward transfer and back transfer between the host molecules and luminophores 42 depend exponentially on the inter-particle distance, the external stress will also cause remarkable variations of the number of excitons in the luminophores 42, leading to modulations (increases or decreases) in the intensity of the electroluminescent light 76. Ideally, both the current and light intensity change linearly with the magnitude of the stress. If the second electrode 30 is sufficiently flexible, the distribution of the stress causes corresponding distributions of the current and light intensity. The transparent substrate 10 and first electrode 20 allow the collection, focusing of the light in a photodetector 78. The photodetector 78 could be but not limited to, a digital camera and an array of silicon photodiodes. The sensor in FIG. 1 can therefore be used to simultaneously detect stress distributions with a high sensitivity by measuring electrical and optical signals. The latter allows direct imaging of contact stress distributions.

Those of ordinary skill in the art will appreciate that the optoelectronic sensor (FIG. 1) can also operate as an electronic sensor by measuring the current signals only in another embodiment. The substrate 10 and first electrode 20 do not have to be transparent. The luminophores 42 are not needed or can be replaced by particles of a non-luminescent material.

Figure 2:
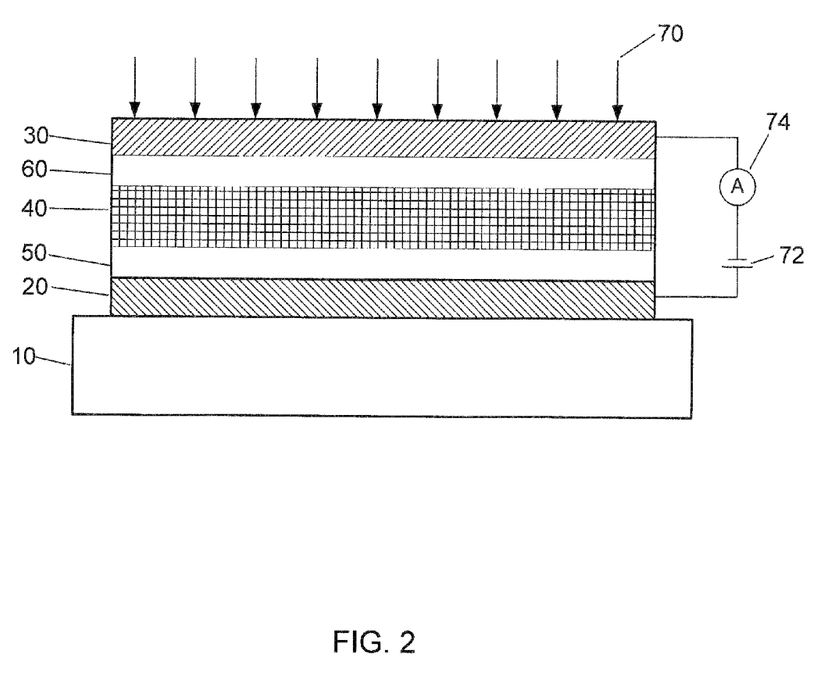
FIG. 2 illustrates the schematic cross section of an electronic or optoelectronic sensor with additional electron and hole injection layers.

Optionally, the sensor structure may also include two charge injection layers, hole injection layer 50 and electron injection layer 60 disposed between the first electrode 20 and second electrode 30 and the active layer 40, respectively, as shown in FIG. 2, which illustrates another embodiment of the present invention. The charge injection layers are employed to enhance the injection and transport of electrons and holes into the active layer. For example, the sensor may include a hole injection layer (HIL) 50 disposed between the first electrode 20 and the active layer 40, and an electron injection layer (EIL) 60 disposed between the second electrode 30 and the active layer 40. In some embodiments, only one charge injection layer, either HIL 50 or EIL 60, is employed in the sensor. The HIL 50 and EIL 60 may be formed by solution processing such as spin-coating and drop casting, or by vacuum deposition. The thickness of HIL 50 and EIL 60 is in the range of 0.1-200 nm, and more preferably in the range of 1-20 nm. The HIL 50 and EIL 60 may include at least one organic, polymeric, or inorganic material. Examples of the HIL material include, but not limited to, poly(3,4-ethylenedioxythiophene)poly(styrenesulfonate) (PEDOT:PSS), $MoO_3$, and $WO_3$. Examples of the EIL material include, but not limited to, copper phthalocyanine (CuPc), tris-(8-hydroxyquinoline)aluminum ($Alq_3$), and LiF.

We have successfully made a prototype light-emitting stress sensor on a glass substrate with pre-patterned indium-tin-oxide (ITO). The substrate was first cleaned in sequence in acetone, ethanol, and de-ionized water, and then exposed to oxygen plasma for 5 min. The active layer was prepared by spin coating a mixture of phosphorescent fac-tris(2-phenylpyridinato-N,C2') iridium (III) [$Ir(ppy)_3$], 4,4'-N,N'-dicarbazole-biphenyl (CBP), and polycarbonate (PC) dissolved in chloroform (10 mg $mL^{-1}$) at 3000 rpm for 1 min. The CBP acted as a host, $Ir(ppy)_3$ acted as the luminophores, and PC was used as a polymer matrix. The weight percentage ratio of the mixture is approximately 20%:50%:30%, for $Ir(ppy)_3$, CBP, and PC, respectively. The thickness of the coated films was about 60 nm. The sample was then transferred to a high-vacuum thermal evaporation system with a base pressure of ~$10^{-8}$ τ, and a 20-nm-thick 2,9-dimethyl-4,7-diphenylphenanthroline (BCP) and a 15-nm-thick $Alq_3$ layer were deposited to block holes and facilitate electron injection. Finally, a 0.5-nm-thick LiF and 120-nm-thick Al cathode were deposited on the organic films through a shadow mask, which defined the active area of the sensor to be 3×3 $mm^2$.

To characterize the device responses to compression, forces were applied uniformly to the sensor through a 3×3 $mm^2$ Si sample placed atop the Al cathode using a probe tip attached to a micropositioner, and were measured by an electronic precision balance with 0.1 g readability. The current-voltage (I-V) characteristics under different stresses were measured using an Agilent 4156C semiconductor parameter analyzer. The light emission at different fixed currents or voltages was recorded in air from the glass side using an Ocean Optics spectrometer.

Figure 3:
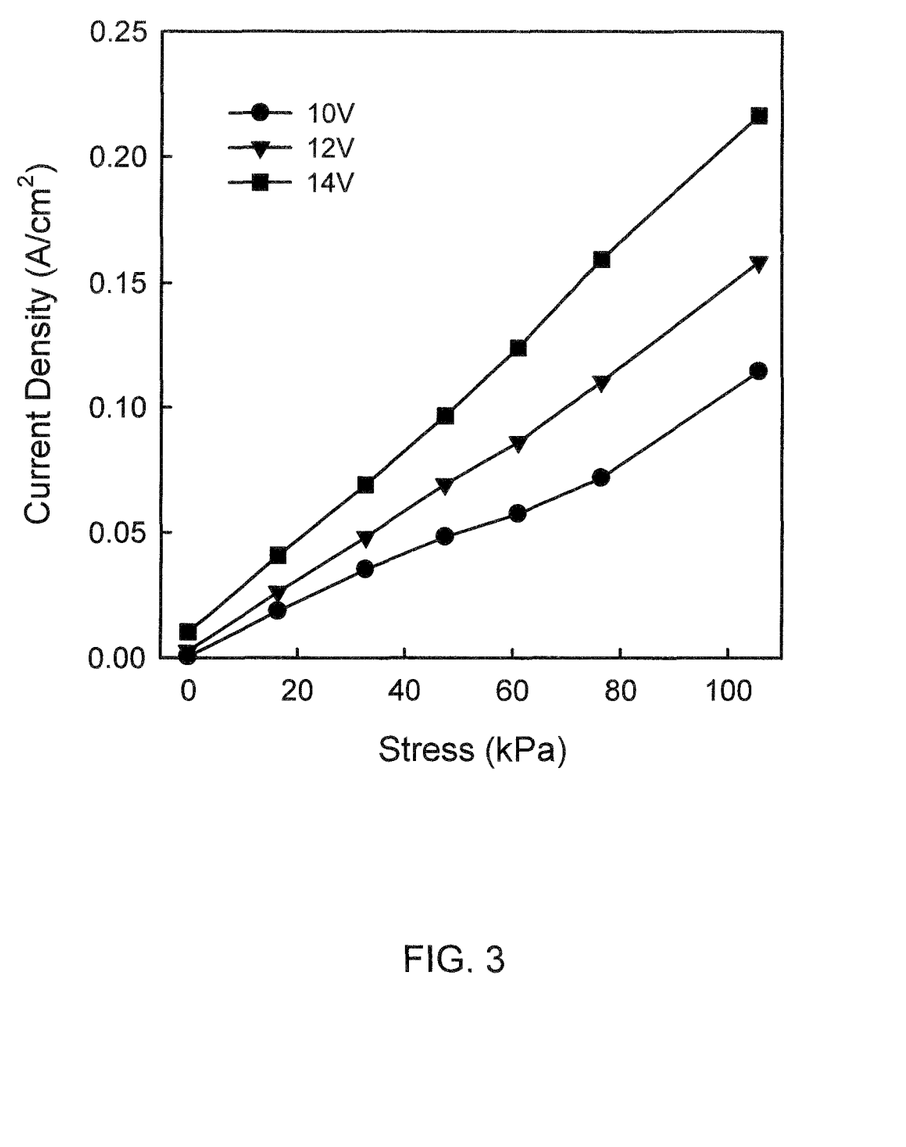
FIG. 3 shows stress-dependent currents in a prototype light-emitting stress sensor with a phosphorescent organic light-emitting layer.

It has been found that a small stress of 16 kPa can cause an increase in the low-bias current by more than two orders of magnitude. The influence of stress on the current density in the device measured at three different fixed voltages is displayed in FIG. 3. At all voltages, the current shows a rapid and nearly linear increase with increasing stress over the entire measurement range from 0-107 kPa. The current sensitivity varies from 94-205 μA $kPa^{-1}$ as the voltage is changed from 10-14 V.

Since the applied stresses are relatively small, they can reduce the intermolecular spacing, but may not change the molecular geometry. The observed current responses thus reflect changes in the electrical conductivity of the organic films. When a uniaxial stress is applied and the current flows along the same direction, the longitudinal piezoresistance coefficient $\pi_1^\sigma$ of a film is defined as the relative change in electrical conductivity per unit stress. $\pi_1^\sigma$ for the prototype sensor structure was found to be nearly independent of the stress and had a value of ~$2\times10^{-3}$ $Pa^{-1}$ at 10 V. This value is more than two orders of magnitude greater than that of typical conjugated polymers and five orders of magnitude greater than that of Si nanostructures. The sensitive piezoresistive response is attributed to increased charge mobilities resulted from stronger intermolecular interaction (charge transfer) in the compressed films. The stress a human finger applies to sense texture and shape is typically on the order of 10-40 kPa. In the prototype devices described herein, an applied stress as low as 6 kPa, which only causes a small percent of deformation, can produce a noticeable current change, suggesting that the devices are capable of sensing touch on a par with a human finger.

Figure 4:
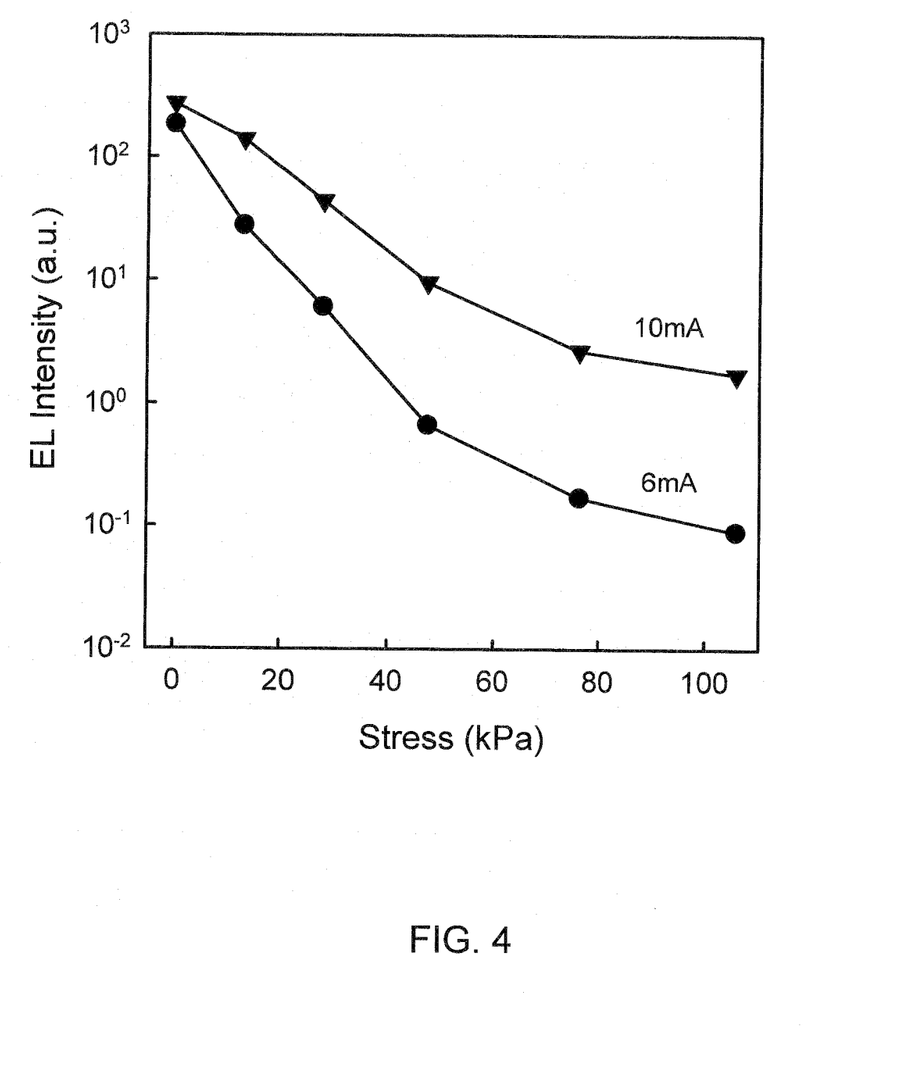
FIG. 4 shows stress-dependent electroluminescence intensity in a prototype light-emitting stress sensor with a phosphorescent organic light-emitting layer.

The electroluminescence (EL) of the prototype sensor exhibited very sensitive but opposite response to the applied forces. While its EL peak position and spectrum shape stayed constant, the light intensity decreased sharply with increasing stress. The dependence of the light intensity of the device on stress at different currents is shown in FIG. 4. At 6 mA, the light intensity shows a monotonic decrease by over three orders of magnitude as the stress varies from 0-107 kPa. These results suggest that the sensor may convert local stresses into both measurable electrical and optical signals with a high sensitivity, and is thus capable of direct imaging of contact stress distributions.

The sensitive optical responses of the sensor to external stresses may be explained as follows. In the hybrid active layer, excitons are generated on the CBP host molecules, and quickly transferred to the Ir(ppy)$_3$ guest molecules. The EL originates from triplet excitons relaxing radiatively to the singlet ground state. Since the lifetime of the emitting triplet state of Ir(III) complexes is quite long, on the order of micro- to milli-seconds, the EL of the device is expected to be very sensitive to back energy transfer from triplets on the guest to triplets on the host molecules via a Dexter process, whose rate is exponentially dependent on the donor-acceptor separation $R_{DA}$. Under normal conditions, the back energy transfer from Ir(ppy)$_3$ to CBP is insignificant due to relatively large $R_{DA}$ as well as the fact that the process is endothermic given the higher energy of the host triplet excitons ($E_{T,CBP}$=2.56 eV) compared to that of the guest triplet excitons ($E_{T,Ir(ppy)3}$=2.42 eV). However, as the intermolecular spacing is squeezed, its rate may increase substantially, leading to weaker confinement of excitons on the guest. When the film is compressed, the back energy transfer followed by nonradiative decay at defects may become the major energy dissipation process, leading to EL quenching.

The above theory has been verified by the findings that similar sensors with fluorescent dyes doped in a CBP host, embedded in a PC matrix, showed much weaker electrical and optical responses to external stresses. Therefore, for high-sensitivity sensors with a polymer/organic hybrid active light-emitting layer, phosphorescent dyes with an exciton energy close to that of the host molecules should be used.

Figure 5:
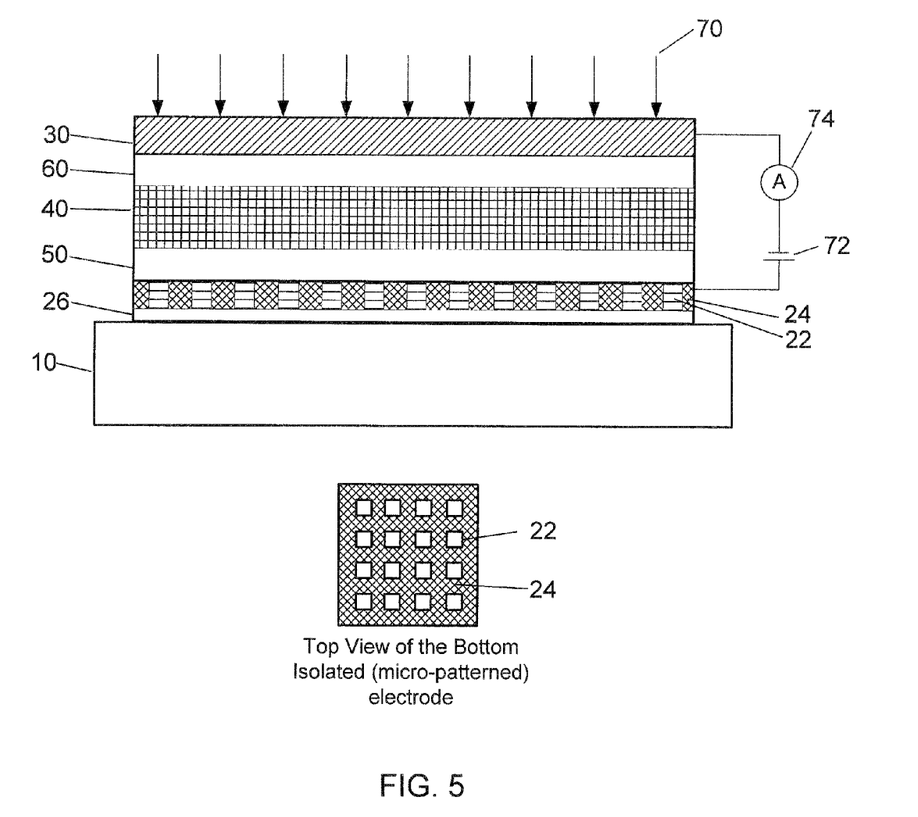
FIG. 5 illustrates the schematic cross section of an electronic or optoelectronic sensor array with a micro-patterned electrode. The top magnified view of the micro-patterned electrode comprising isolated micro-contacts is also shown.
Figure 6:
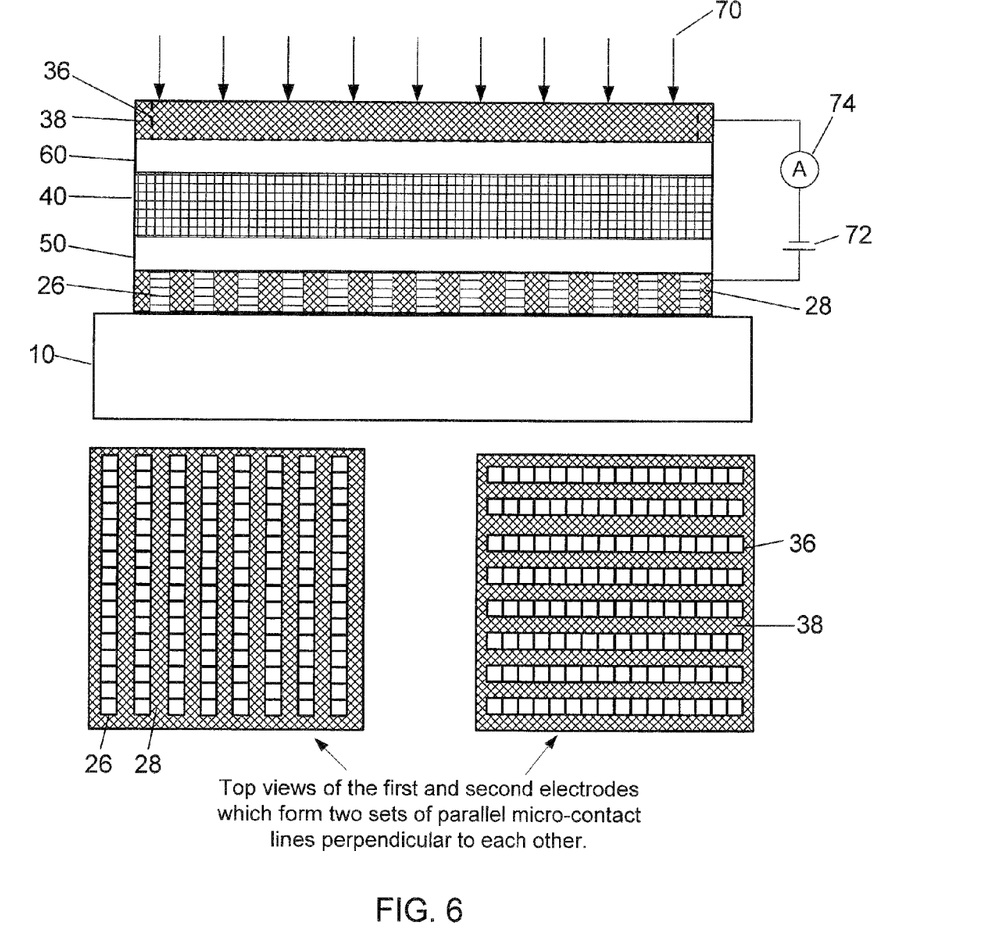
FIG. 6 illustrates the schematic cross section of an electronic or optoelectronic sensor array with two micro-patterned electrodes. The top magnified views of micro-patterned electrodes comprising two perpendicular sets of parallel micro-contact lines are also shown.

The spatial resolution of the sensors in accordance with embodiments of the present invention is determined by the lateral current distribution in the hybrid device structure. The low lateral electrical conductivity in the thin semiconducting polymer/organic layers 40, 50, & 60, along with the excellent flexibility of organic and polymer materials, ensures a high spatial resolution of the sensors required for tactile sensing. The resolution may be further improved by replacing one or both of the first electrode 20 and second electrode 30 in FIGS. 1 and 2 by micro-patterned electrodes. There are different designs of micro-patterned electrodes. FIGS. 5 and 6 illustrate two exemplary embodiments of the stress sensor with micro-patterned electrodes. In FIG. 5, at least one of the first electrode 20 and second electrode 30 comprises an array of micro-contacts 22 separated by an insulting material 24. The sensor thus becomes an array of micro-sensor units better suited for measuring stress-induced light distributions. The micro-contacts 24 are disposed on a continuous contact layer 26 so that the same bias can be applied to all sensor units. This contact scheme may also be used to map current distributions in the sensor if the micro-contacts are deposited on a standard printed circuit board which allows the control of each individual sensor unit. If the sensor works as an optoelectronic device, the first electrode 20 components, including the micro-contacts 22, insulator 24, and continuous contact layer 26 must be transparent or semitransparent. The materials and thickness of the substrate 10 and the layered hybrid structure 40, 50, & 60 are identical for the device in FIG. 5 and the device in FIG. 2, where the HIL (50) and EIL (60) are optional.

For those of ordinary skill in the art will appreciate that there are different methods to process such a micro-patterned electrode. For example, it can be fabricated by standard lithography and deposition. An insulting layer comprising $SiO_2$ or $SiN_x$ is first deposited on the continuous contact layer (26). A photoresist layer is then spin-coated, exposed, and developed to open an array of micro-sized holes. After etching of the insulating material in the opening areas, a conducting layer of transparent or semitransparent conductive material is deposited. Finally, lift-off is done to remove the photoresist along with the conducting material deposited atop, leaving micro-contacts 22 separated by insulators 24 on the continuous contact layer 26. The micro-contacts 22 may also be deposited through a shadow mask with micro-sized openings. The resolution of the sensing device will be determined by the periodicity of the electrode pattern. In order to achieve a resolution which is sufficiently high for tactile sensing and biometric applications, the periodicity of the micro-contacts should be less than 100 µm, and more preferably less than 40 µm. The size of the micro-contacts is typically greater than 1 µm but smaller than 40 µm. For those of ordinary skill in the art will appreciate there are many methods to process the stress-induced current and/or light emission distributions by feeding them to signal processing instruments for data acquisition, storage, computation, and display. The signal processing instruments can feed back the signals to an entity that holds the stress sensor to invoke desirable actions including changes in the magnitudes of the applied stress and voltage.

FIG. 6 illustrates another exemplary embodiment of the hybrid sensor with micropatterned electrodes. The materials and thickness of the substrate 10 and the layered hybrid structure 40, 50, & 60 are identical for the device in FIG. 6 and the device in FIG. 2, where the HIL 50 and EIL 60 are optional. The first electrode 20 and second electrode 30 are two sets of parallel micro-contact lines 28 and 38, which are perpendicular or orthogonal to each other. An array of pixels forms at the spots where the contact lines sandwich portion of the active layer 40, capable of measuring current and light distributions at a high resolution. The micro-contact lines 28 and 38 are isolated by an insulating material 26 and 36. The width and periodicity of the micro-contact lines 28 and 38 do not have to be the same. Typically, the width is greater than 1 µm but smaller than 40 µm. The periodicity is less than 100 µm, and more preferably less than 40 µm. The metal lines may be fabricated by standard lithography and deposition techniques, or simply formed by deposition through a shadow mask.

The prototype sensor described earlier was subjected to different reliability tests, including cycle testing. The device exhibited stable and reversible changes in current and light intensity as a constant stress was alternatively applied. The results demonstrated very good repeatability and robustness of the sensor. Stress sensors in accordance with embodiments of the present invention may be further passivated and encapsulated to improve its durality and reliability. For example, the sidewalls of the sensors may be protected by a dielectric layer from reactions with atmosphere.

The various embodiments described herein are merely descriptive of the present invention and are in no way intended to limit the scope of the invention. Modifications of the present invention will become obvious to those having skill in the art in light of the detailed description herein, and such modifications are intended to fall within the scope of the appended claims.

What is claimed is:

1. A sensing device, which converts a stress field into optical signals, comprising:
   a supporting substrate;
   a first electrode disposed above the substrate;
   a hybrid active layer comprising luminophores embedded in an electrically insulating matrix disposed above the first electrode;
   a second electrode disposed above the hybrid active layer;
   an electrical potential applied across the first electrode and second electrode resulting in light emission from the hybrid active layer; and
   a stress field experienced by the second electrode or the substrate produces variations of the intensity of the light emission from the hybrid active layer whereby the intensity of the light emission decreases with increasing stress field magnitude.

2. The sensing device of claim 1, wherein the substrate is transparent to the light emission by the active layer.

3. The sensing device of claim 1, wherein the substrate is semi-transparent to the light emission by the active layer.

4. The sensing device of claim 1, wherein the hybrid active layer further comprises a host wherein luminophores are doped in the host and the host is embedded within the matrix.

5. The sensing device of claim 1 further comprising a hole injection layer disposed between the active layer and the first electrode.

6. The sensing device of claim 5 wherein the hole injection layer comprises at least one of an organic material, a polymeric material, or an inorganic material.

7. The sensing device of claim 1 further comprising an electron injection layer disposed between the active layer and the second electrode.

8. The sensing device of claim 7 wherein the electron injection layer comprises at least one of an organic material, a polymeric material, or an inorganic material.

9. The sensing device of claim 1, wherein at least one of the first electrode and second electrode is transparent to the light emitted by the active layer.

10. The sensing device of claim 1, wherein at least one of the first electrode and second electrode is semi-transparent to the light emitted by the active layer.

11. The sensing device of claim 1, wherein at least one of the first electrode and the second electrode comprises an array of micro-contacts isolated by insulators.

12. The sensing device of claim 11, wherein the micro-contacts are disposed on a continuous contact layer.

13. The sensing device of claim 1, wherein the first electrode and the second electrode each comprise a set of parallel micro-contact lines such that the parallel micro-contact lines of the first electrode and parallel micro-contact lines of the second electrode are positioned perpendicular to each other.

14. The sensing device of claim 1, wherein the stress field results from physical contact with the second electrode or the substrate.

15. The sensing device of claim 1, wherein the stress field results from a pressure applied to the second electrode or the substrate.

16. The sensing device of claim 1, wherein the stress field is experienced by the second electrode or the substrate resulting from a temperature gradient.

17. The sensing device of claim 1, wherein the stress field is experienced by the second electrode or the substrate resulting from a surface adsorption.

18. The sensing device of claim 4, wherein the luminophores comprise organic dyes, polymeric dyes, nanocrystals, or combinations thereof.

19. The sensing device of claim 1, wherein the matrix further comprises a mechanically stable material supporting the hybrid active layer, whereby the hybrid active layer can withstand repetitive stress loading cycles.

20. The sensing device of claim 4, wherein the host comprises a polymer, an organic material, or combinations thereof.

21. The sensing device of claim 18, wherein the organic dyes comprise small-molecule phosphorescent dyes.

22. The sensing device of claim 18, wherein the nanocrystals comprise colloidal quantum dots based of at least one of CdS, CdSe, CdTe, ZnS, ZnSe, GaAs, or InP.

23. A sensing device which converts a stress field into electrical and optical signals, comprising:
   a supporting substrate;
   a first electrode disposed above the substrate;
   a hybrid active layer comprising organic dye embedded in a matrix disposed above the first electrode;
   a second electrode disposed above the hybrid active layer;
   an electrical potential applied across the first electrode and second electrode resulting in light emission from the hybrid active layer and electrical current flow through the hybrid active layer; and
   a stress field experienced by the second electrode or the substrate producing variations of the intensity of the light emission from the hybrid active layer and variations of the electrical current flow through the hybrid active layer.

24. The sensing device of claim 23, wherein the hybrid active layer further comprises a host wherein luminophores are doped in the host and the host is embedded within the matrix.

25. A sensing device which converts a stress field into electrical and optical signals, comprising:
   a supporting substrate having a first and second surface;
   a first electrode having a first and second surface;
   a second electrode having a first and second surface;
   the first surface of the first electrode adjoining the second surface of the substrate;
   a hybrid active layer having a first and second surface;
   the hybrid active layer further comprising organic dye doped in a host, the host embedded in an electrically insulating matrix;
   the first surface of hybrid active layer adjoining the second surface of the first electrode;
   the first surface of the second electrode adjoining the second surface of the hybrid active layer;
   an electrical potential applied across the first electrode and second electrode resulting in light emission from the hybrid active layer and electrical current flow through the hybrid active layer; and
   a stress field between 6 kPa and 107 kPa experienced by the second surface of the second electrode or the first surface of the substrate resulting in variations of the intensity of the light emission from the hybrid active layer and variations of the electrical current flow through the hybrid active layer.

26. The sensing device of claim 23, wherein the matrix further comprises a mechanically stable material supporting the hybrid active layer, whereby the hybrid active layer can withstand repetitive stress loading cycles.

27. The sensing device of claim 25, wherein the matrix further comprises a mechanically stable material supporting the hybrid active layer, whereby the hybrid active layer can withstand repetitive stress loading cycles.

\* \* \* \* \*